(12) United States Patent
Criel et al.

(10) Patent No.: US 8,916,014 B2
(45) Date of Patent: *Dec. 23, 2014

(54) METHOD FOR PRODUCING A FUEL TANK PROVIDED WITH INTERNAL ACCESSORIES

(71) Applicant: Inergy Automotive Systems Research, Brussels (BE)

(72) Inventors: Bjorn Criel, Sint-Martens-Lennik (BE); Nadja Walling, Margny-les-Compiegne (FR); Fabrice Laborde, Toulouse (FR); Hervé Lemoine, Tracy-le-Mont (FR)

(73) Assignee: Inergy Automotive Systems Research, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,600

(22) Filed: Jun. 4, 2013

(65) Prior Publication Data

US 2013/0264736 A1    Oct. 10, 2013

Related U.S. Application Data

(63) Continuation of application No. 11/993,424, filed as application No. PCT/EP2006/063590 on Jun. 27, 2006, now Pat. No. 8,475,614.

(30) Foreign Application Priority Data

| Jun. 28, 2005 | (FR) | 05 06574 |
| Aug. 24, 2005 | (FR) | 05 08707 |
| Feb. 3, 2006 | (FR) | 06 01018 |

(51) Int. Cl.
*B60K 15/03* (2006.01)
*B29C 51/12* (2006.01)
(Continued)

(52) U.S. Cl.
CPC .......... *B60K 15/03* (2013.01); *B29C 2049/2073* (2013.01); *B29C 47/0054* (2013.01);
(Continued)

(58) Field of Classification Search
CPC ............ B29C 49/20; B29C 2049/2008; B29C 2791/006; B29C 49/04; B29L 2031/7172
USPC .......................................................... 156/242
See application file for complete search history.

(56) References Cited

U.S. PATENT DOCUMENTS

| 4,178,955 A | 12/1979 | Dau |
| 4,526,286 A | 7/1985 | Ju/ng et al. |

(Continued)

FOREIGN PATENT DOCUMENTS

| DE | 19600872 | 7/1997 |
| DE | 10010900 | 9/2001 |

(Continued)

OTHER PUBLICATIONS

Indian Office Action issued Sep. 24, 2014, in application No. 6032/CHENP/2007, filed Dec. 28, 2007.

*Primary Examiner* — Philip Tucker
*Assistant Examiner* — Vicki Wu
(74) *Attorney, Agent, or Firm* — Oblon, Spivak, McClelland, Maier & Neustadt, L.L.P.

(57) ABSTRACT

Method for producing a fuel tank provided with internal accessories and having a wall made of plastic made in a single piece by molding a split parison or a parison in at least two parts, said method comprising the following steps: a) the parison is introduced in the heat-softened state into a mould comprising dies; b) a core on which the accessories are placed is introduced inside the parison; c) the parison is pressed onto the dies of the mould; d) the accessories are fastened to the parison with the aid of the core in an ideal layout; e) the core is withdrawn and the mould is closed; f) the tank is molded from the parison; and g) the tank is removed from the mould.

21 Claims, 1 Drawing Sheet

(51) Int. Cl.
  *B29C 49/20* (2006.01)
  *B29C 47/00* (2006.01)
  *B29C 49/04* (2006.01)
  *B29C 49/00* (2006.01)
  *B29C 47/02* (2006.01)
  *B29C 49/42* (2006.01)
  *B29C 51/26* (2006.01)
  *B29C 51/06* (2006.01)
  *B29C 49/62* (2006.01)
  *B29L 31/00* (2006.01)
  *B29C 49/16* (2006.01)

(52) U.S. Cl.
  CPC ............... *B29C 49/04* (2013.01); *B29C 49/20* (2013.01); *B29C 2049/2008* (2013.01); *B29C 49/0047* (2013.01); *B29C 47/02* (2013.01); *B29C 49/4247* (2013.01); *B29C 51/12* (2013.01); *B29C 51/267* (2013.01); *B29C 47/0066* (2013.01); *B29C 2793/0063* (2013.01); *B29C 2791/006* (2013.01); *B29K 2995/0067* (2013.01); *B29C 2791/007* (2013.01); *B29C 51/06* (2013.01); *B29C 49/62* (2013.01); *B29L 2031/7172* (2013.01); *B29C 47/003* (2013.01); *B29C 49/16* (2013.01)
  USPC ........................ 156/242; 264/516; 264/40.1

(56) References Cited

U.S. PATENT DOCUMENTS

| | | |
|---|---|---|
| 4,574,025 A | 3/1986 | Juaire et al. |
| 4,719,072 A | 1/1988 | Kojima et al. |
| 4,891,000 A | 1/1990 | Ishii |
| 5,445,783 A | 8/1995 | Irish et al. |
| 5,900,205 A | 5/1999 | Sadr et al. |
| 6,814,921 B1 | 11/2004 | Van Schaftingen et al. |
| 6,866,812 B2 | 3/2005 | Van Schaftingen et al. |
| 7,166,253 B2 | 1/2007 | Van Schaftingen et al. |
| 8,475,614 B2 * | 7/2013 | Criel et al. ............ 156/92 |
| 2001/0015513 A1 | 8/2001 | Van Schaftingen et al. |
| 2002/0125254 A1* | 9/2002 | Hagano et al. ............ 220/562 |
| 2003/0047563 A1 | 3/2003 | Reinelt et al. |
| 2005/0284871 A1 | 12/2005 | Leonard et al. |
| 2006/0032662 A1 | 2/2006 | Hosoya |
| 2007/0290414 A1 | 12/2007 | Criel |
| 2008/0164639 A1 | 7/2008 | Criel et al. |
| 2008/0224363 A1 | 9/2008 | Criel et al. |
| 2009/0019683 A1 | 1/2009 | Jannot et al. |
| 2009/0026664 A1 | 1/2009 | Criel et al. |
| 2009/0152263 A1 | 6/2009 | Criel et al. |
| 2009/0166934 A1 | 7/2009 | Masse et al. |
| 2009/0250161 A1 | 10/2009 | Mabed et al. |
| 2009/0250458 A1* | 10/2009 | Criel et al. ............ 220/4.13 |
| 2009/0250846 A1 | 10/2009 | Criel et al. |
| 2010/0044927 A1 | 2/2010 | Criel et al. |
| 2013/0008908 A1 | 1/2013 | Hill et al. |

FOREIGN PATENT DOCUMENTS

| | | |
|---|---|---|
| EP | 1110697 | 6/2001 |
| FR | 2494176 | 5/1982 |
| FR | 2879122 | 6/2006 |
| FR | 2879494 | 6/2006 |
| GB | 1410215 | 10/1975 |
| JP | 2004188928 A | 7/2004 |
| WO | 2004/007182 | 1/2004 |
| WO | 2004031044 | 4/2004 |

* cited by examiner

METHOD FOR PRODUCING A FUEL TANK PROVIDED WITH INTERNAL ACCESSORIES

CROSS REFERENCE TO RELATED APPLICATIONS

This application is a continuation application of prior U.S. application Ser. No. 11/993,424, filed Feb. 24, 2010 now U.S. Pat. No. 8,475,614, the disclosure of which is incorporated herein by reference in its entirety. The parent application is the National Stage of PCT/EP2006/063590, filed Jun. 27, 2006, the disclosure of which is incorporated herein by reference in its entirety. The parent Application claims priority to French Application No. 05.06574, filed Jun. 28, 2005, French Application No. 05.08707, filed Aug. 24, 2005, and French Application No. 06.01018, filed Feb. 3, 2006, the disclosures of which are incorporated herein by reference in their entireties.

BACKGROUND OF THE INVENTION

The present invention relates to a method for producing a fuel tank provided with (at least partly) internal accessories and in particular a component for putting the inside and outside of said tank into fluid communication.

Fuel systems on board vehicles of various types generally comprise devices which provide ventilation of hydrocarbons contained in the tank. They may also comprise devices for supplying the engine with fuel. Such devices form a link between the components contained in the tank (valves, fuel pump, etc.) and components positioned outside this (canister, filling pipe, etc.). The passage through the wall of the tank must be made taking into account the leakproof requirements laid down by current environmental standards (LEV II, PZEV for example). To this end, the reduction in the number and size of openings in the wall of the tank constitutes a favourable factor in the reduction of evaporation losses. However, this makes it more difficult to insert and position components inside the tank.

Moreover, the tank is generally fitted with circuits (for example for ventilation, fuel supply) comprising pipes, valves, small pipes etc. positioned inside the tank and, as the case may be, connected to components situated outside the tank. Now, when fluid communication is made between the inside and outside of the tank through the wall, it is possible, according to the position of the opening in the wall (for example at the location of a plate), that siphons are created in the pipes. In the case of ventilation circuits, these constitute a disadvantage, since the accumulation of liquid conveyed by vapours can lead to a malfunction of the ventilation system. In addition, in the case of fuel supply lines, it is possible that the location of the plate involves a detour or an unnecessary length of said pipe.

Finally, the tank generally includes other accessories such as an anti-wave (and an associated anti-noise) baffle or baffles, a device for separating liquid from vapour, a gauge or gauges for measuring the fuel level, a reserve tank etc. The object of the latter is to prevent failure of the pump to prime in the case where the vehicle runs out of fuel or when it is parked for a long time on a slope for example. It is generally provided with a valve ("first fill valve") making it possible to fill it when the tank is first filled and/or after running out of fuel, and its size is generally limited by the size of the orifice to be made in the tank in order to be able to introduce it therein.

All these internal accessories (more exactly at least partly internal accessories) are generally placed/attached inside the tank after this is moulded, by separate operations that take time and labour and are therefore costly. Moreover, as previously mentioned, with a view to reducing the size and number of orifices through the wall for introducing said accessories, an attempt is often made to group these together and, on account of this, their location is not optimal (that is to say the performance of said accessory is not optimized).

Application EP 1110697 in the name of the Applicant discloses a method for moulding a fuel tank using a parison in several parts so as to be able to insert the accessories into the tank at the same time as it is moulded. With a view to reducing the number of components to be introduced and fastened inside the tank, this document recommends the use of pre-assembled structures, which solves the problem of the number of openings and of the overall duration of the moulding cycle, but does not always solve the problem of an optimized location for the various accessories. The object of the invention is consequently to provide a method which enables this problem to be solved and this by virtue of the use of a single support (called a "core") on which the accessories are positioned in an ideal layout and which makes it possible to fasten said accessories at their ideal location in the tank in a single step. In particular, in a variant, the method according to the invention makes it possible to produce a fuel tank made of plastic with fluid communication between the inside and outside of said tank, through an opening with reduced dimensions, the location of which may be freely chosen so as to prevent the creation of siphons and/or detours of the lines and this by means of a method involving a minimum number of steps.

SUMMARY OF THE INVENTION

To this end, the invention relates to a method for producing a fuel tank provided with internal accessories and having a wall made of plastic made in a single piece by moulding a split parison or a parison in at least two parts, said method comprising the following steps: [0008] a) the parison is introduced in the heat-softened state into a mould comprising dies; [0009] b) a core on which the accessories are placed is introduced inside the parison; [0010] c) the parison is pressed onto the dies of the mould; [0011] d) the accessories are fastened to the parison with the aid of the core in an ideal layout; [0012] e) the core is withdrawn and the mould is closed; [0013] f) the tank is moulded from the parison; and [0014] g) the tank is removed from the mould.

DETAILED DESCRIPTION OF THE INVENTION

Figure 1:
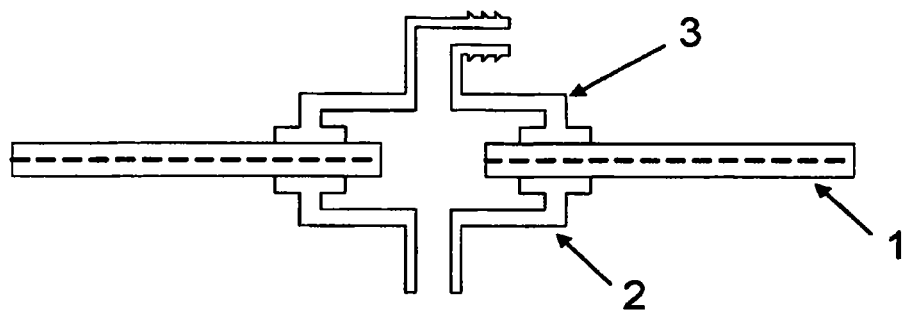
FIG. 1 represents a component in two parts (2, 3), one of which (2) is welded onto the inner face of the wall (1) of a fuel tank and the other (3) is welded onto its outer surface according to one embodiment of the invention.

"Accessory" is understood to denote, within the context of the invention, a component or assembly of components having an active function in the tank such as to ventilate, to convey fuel to the engine, to measure the liquid level, to reduce noise associated with waves etc. In particular, it consists of a component or assembly of components of which the function may be optimized according to its or their location. In particular, it may consist of a ventilation line and/or a line for supplying fuel or electricity, the location of the outlet point of which can consequently be freely chosen (in order to prevent the formation of siphons and/or to enable the length of said line to be optimized and/or to increase the working volume of the tank). Similarly, it may consist of an anti-slosh baffle or baffles of which the acoustic performance depends in particular on the position of the fuel gauge or gauges, the measuring precision of which also depends on the position. The invention applies particularly well to components establishing fluid communication between the inside and outside of the tank, such as the aforementioned ventilation and fuel supply lines, since it also enables, according to one of its variants, a completely leakproof fluid communication to be obtained.

According to this variant, during step b), there is introduced inside the parison at least part of a component comprising a pipe and/or an orifice for the passage of fluid and, during step d), this component part is fastened to the parison, the method according to this variant of the invention additionally comprising a step during which an opening is made in the wall of the tank, this opening being localized at the place where the component part is fastened to the parison so as to free the opening or pipe therefrom and to permit fluid communication between the inside and outside of the tank.

A fuel tank is understood to mean a leakproof tank capable of storing fuel under the conditions of use and under diverse and various environmental conditions. An example of this tank is one which is fitted to motor vehicles.

The fuel tank according to the invention is made with a plastic wall, generally comprising an inner face on its concave part and an outer face on its convex part.

Plastic denotes any material comprising at least one polymer made of synthetic resin. All types of plastic are suitable. Plastics that are particularly suitable belong to the category of thermoplastic materials.

A thermoplastic material denotes any thermoplastic polymer including thermoplastic elastomers, as well as mixtures thereof. The term "polymer" denotes homopolymers as well as copolymers (in particular binary or ternary). Examples of such copolymers are, in a non-limiting manner: copolymers with a random distribution, sequenced copolymers, block copolymers and grafted copolymers.

Any type of thermoplastic polymer or copolymer of which the melting point is below the decomposition temperature are suitable. Synthetic thermoplastic materials which have a melting range extending over at least 10 degrees Celsius are particularly suitable. As an example of such materials, are those that have a polydispersion of their molecular weight.

In particular, use may be made of polyolefins, thermoplastic polyesters, polyketones, polyamides and copolymers thereof. A mixture of polymers or copolymers may also be used, as well as a mixture of polymeric materials with inorganic, organic and/or natural fillers such as, for example, in a non-limiting manner: carbon, salts and other inorganic derivatives, natural or polymeric fibres. It is also possible to use multilayer structures consisting of stacked cohesive layers comprising at least one of the polymers or copolymers described above.

A polymer that is often employed is polyethylene. Excellent results have been obtained with high density polyethylene (HDPE).

Preferably, the tank for which the method according to the invention is intended, comprises a multilayer structure comprising at least one layer of thermoplastic material and at least one supplementary layer which can, advantageously, consist of a material that is a barrier to liquids and/or gases.

Preferably, the nature and thickness of the barrier layer are chosen so as to limit to the maximum the permeability to liquids and gases in contact with the wall of the tank. Preferably, this layer is based on a barrier material, that is to say a resin that is impervious to fuel such as EVOH for example (partially hydrolysed ethylene-vinyl acetate copolymer). Alternatively, the tank may be subjected to a surface treatment (fluorination or sulphonation) aimed at making it impervious to fuel.

A parison, is understood to mean a preform, generally extruded and with any shape, generally substantially flat or tubular which is intended to constitute the wall of the tank after moulding, that is to say after an operation which consists of giving the parison which is in the heat-softened state, the required shapes and dimensions with the aid of a mould so as to obtain a tank in one piece.

The method according to the invention uses a core. This is understood to mean a part of a suitable size and form so as to be capable of being inserted between the cavities of the mould. Such a part is for example described in patent GB 1,410,215, of which the contents are introduced to this end as a reference in the present application. Within the context of the invention, the main function of the core is to position and fasten accessories onto the parison. When the accessories are fastened by welding, the core may be provided with heating parts (mirrors for example) keeping hot the part of the accessory to be welded (which is generally preheated, by infrared heating for example, beside the core). It may be provided with heating parts (filaments for example) in the zone or zones that will be in contact with the parison during the placement of accessories (see further on).

It should be noted that preheating the components within the context of fastening a component by welding, should not be compulsorily made onto the core. Mirrors (or other preheating tools) may be positioned for example on the frame of the machine without forming part of the core. On the other hand the mirror (or other preheating tool) should be positioned at the right moment in the cycle at the right location in order to be able to preheat the component.

The core may also serve to blow in gas under pressure into the mould in order to press the parison onto the dies of the mould. In this way it contributes to moulding the tank, even providing the major part of the deformation of the parison (typically of the order of 80%, or even 90% and even at least 95% of the deformation required to obtain the tank) before the accessories are fastened there.

To this end, the core possesses at least one orifice connecting the inner space of the core to a 3-way valve, connected on the one hand to an external source of air under pressure and, on the other hand, directly connected to atmosphere. During the first blow moulding, the controlled 3-way valve connects the air reservoir to the core in this way releasing air in the core and the mould. At the end of this first blow moulding, before opening the mould, the core must be connected to the atmosphere, which is carried out by controlling the 3-way valve, this time connecting the volume of air of the core with the outside. An alternative design consists of making two orifices in the core, with two separately controlled 2-way valves, one connected to the air reservoir and the other to the atmosphere.

Air is injected into the core via a single orifice, calculated for a given flow rate (ideally with a diameter of two inches) or via a hole provided with a blow moulding nozzle. The nozzle then enables the air jet to be directed, and in this way to prevent any impact of the airflow onto a heating element or a component to be installed in the tank.

The circuit for pre-blow moulding (or for blow moulding into the core) described above is completely independent of the inflation circuit which ensures the second blow moulding.

Finally, the core may also be used to control the method, at least in part. To this end, a camera can be incorporated for example at the core so as to visualize and check, by image analysis, the quality of the attachment of accessories. One or more sensors for measuring values such as force, travel, pressure and temperature can also be installed on the core so as check more effectively the attachment of accessories.

In the method according to the invention, the internal accessories are fastened onto the parison with the aid of the core according to an ideal layout. This is understood to mean that at least some of these have a location such that their performance is optimized. Preferably, this layout is such that, overall, the performance of the tank and/or its working internal volume are optimized. In order to enable the core to perform such positioning, it is advantageous to pre-position the accessories at the corresponding location on the die before the dies carrying the parison surround the core carrying the accessories. In other words, they are pre-positioned on the core so as to be as near as possible to the corresponding ideal location on the dies when the mould is closed.

It may also be advantageous to provide the core with one or more jacks enabling the component to be firmly fastened by welding or pop-riveting.

In the method according to the invention, the tank is moulded in a single piece (in a single step following which a tank is obtained in a single piece, without recourse to a supplementary step of assembling separate shells) from a spilt parison or a parison in at least two parts, and this generally by welding the slit or the two parts of the parison when the mould is closed. In particular, advantageously, the tank is moulded by: [0038] blow moulding, that is to say by expanding and pressing a tubular parison comprising at least one cut-out onto the walls of a mould by means of a pressurized fluid (as described in application EP 1110697, the contents of which are incorporated to this end by way of reference in the present application); [0039] thermoforming sheets, that is to say by pressing these against the walls of a mould, for example by creating suction (making a vacuum) behind these.

In the method according to the invention, the so-called forming of the parison (that is to say its deformation in order substantially to acquire the shape of the tank) principally takes place during step c). During step f) (during which the abovementioned welding is carried out) pressure (or suction) is simply maintained so as to ensure the dimensional stability of the tank.

In the case of a blow moulded tank, after extrusion of a single tubular parison, the latter is cut over all or part of its length, preferably along two diametrically opposed lines.

Compared with the blow moulding of two extruded sheets separately, and of which the thickness is constant, this way of proceeding makes it possible to use parisons with a variable thickness (that is to say not constant over the length), obtained by means of a suitable extrusion device (generally an extruder provided with a die with a plunger of which the position is adjustable). Such a parison takes account of the reduction in thickness which takes place during blow moulding at some places of the parison, following an irregular degree of deformation of the material in the mould.

Preferably, the tank is moulded by blow moulding. In point of fact, thermoforming generally involves heating the mould to 60.degree. C. so as to be able to achieve deep deformations (corners of the tank for example where the parison is highly stretched). The result is cycle times that are longer than with blow moulding, where this constraint does not exist.

To this end, the dies of the mould are generally closed on the core—that is to say they are in contact with it and delimit a sealed zone either side of the core—during steps c) and d). Or more exactly: since these dies carry the parison, the core is in contact with the parison, which is consequently held in a sandwich between the core and the dies of the mould. This contact zone is preferably outside the weld zone. If the contact zone with the core comprises/is the weld zone of the parison, it is then preferable to heat the core in the contact zone so as to ensure welding. It then consists to some extent of a first closure of the mould, with the core inserted between and in contact with the dies, and by which pressurized gas (generally air), is blow in. Generally, this zone is located in the peripheral part of the dies and often is also in the peripheral part of the core. This first closure of the mould constitutes what is called "pre-blow moulding" (or first blow moulding).

The pressure of the gas during the pre-blow moulding step is preferably greater than or equal to 1 bar, preferably 2 bar, or even 3 bar. It is however generally below or equal to 6 bar, preferably 5 bar.

The pressure of the gas for blow moulding after the second closure of the mould is generally higher, typically greater than 6 bar, preferably 7 bar. It advantageously however does not exceed 10 bar.

During the blow moulding steps, the pressure of the gas advantageously combines with a pressure reduction (application of vacuum) behind the dies (or outer parts) of the mould. This pressure reduction is preferably of the order of hundreds of mbar (typically between 100 and 500 mbar, preferably between 200 and 400 mbar).

In the case of moulding by blow moulding, the method according to the invention also includes a degassing step which is carried out before each opening of the mould, that is to say before steps e) and g). The degassing step may be carried out in a suitable manner. Generally, the parison is first of all pierced (for example by pricking it with a needle) and then the fluid is evacuated from the mould (for example with the aid of a valve). In the case where the tank is moulded by thermoforming, it is not necessary for the mould to be closed onto the core in order to press the latter onto the dies (since pressing is done by suction under the latter and not by blow moulding via the core).

In this variant of the invention (where the tank is moulded by blow moulding carried out at least partly by the core), it is advantageous for pre-blow moulding with the aid of the core to be such that the parison already substantially has the dimensions of the tank (or in other words, the deformation of the parison takes place substantially during this step and not during the second closure of the mould).

During the method according to the invention, there is preferably a device preventing the slit or edges of the parts of the parison from welding during the first closure of the mould (when the parison is pressed onto the dies so as to fasten the accessories onto the parison). This device is advantageously incorporated in the core. To this end, the core preferably has a suitable shape and size so as to be partly (generally at least over part of its periphery) inserted between the parts of the parison to be welded (lips of the slit or edges of the two parts). In order to facilitate welding during step f), the dies of the mould are advantageously provided with a thermal regulation device enabling the weld zone to be heated during the steps concerned by the first closure of the mould, where appropriate.

As mentioned previously, the core may also incorporate such a device (for thermal regulation) in its contact zone or zones with the parison and this in particular in the case where this includes the aforementioned weld zone. This variant could improve still further the quality of the weld of the tank (by reducing the internal bead and therefore by improving the impact resistance of the tank). Such an apparatus is for example described in application FR 04.13407 in the name of the Applicant, the contents of which are incorporated to this end by reference in the present application.

According to a first preferred variant, the accessories that are fastened onto the parison with the aid of the core comprise a reserve tank making it possible to prevent a failure of the pump to prime in the case where there is a breakdown due to lack of fuel or during parking for a long time on a slope for example. Recourse to the method according to the invention makes it possible not only freely to choose the volume of this tank (and therefore by choosing a large size for this to satisfy the specifications of all car manufacturers), but also to optimize the position of the latter so that it can be connected directly to the filling pipe (optionally via a leakproof flexible connector (made of rubber and/or corrugated)) so as to avoid having recourse to a "first fill valve" as previously explained. In this variant, the non-return valve (ICV) generally present at the bottom of the filling pipe may advantageously be incorporated in the abovementioned flexible connector, and this for reasons of ease of assembly.

The tank according to this variant of the invention may be fastened to the parison by any suitable means (welding, overmoulding, pop-riveting etc). The technique of pop-riveting is particularly well suited.

According to another preferred variant already previously mentioned, at least one accessory comprises a component provided with a pipe or an opening for the passage of a fluid. The component referred to in this variant of the invention is an object which permits fluid (vapour and/or liquid) communication between the inside and outside of the fuel tank. It may consist of a small pipe, a valve etc. It advantageously consists of at least one part of the ventilation line or of the fuel supply line of the tank.

This object preferably comprises a base, generally in a flattened form, and at least one profiled part or pipe. The base generally has a perimeter with a circular shape and the pipe generally has a substantially cylindrical shape. In a preferred manner, this pipe is situated at least partly outside the tank when the component is fastened to the wall of the tank. It enables a connection to be made to a canister for example, in the case where the component serves to attach a ventilation circuit. It may also enable a connection to be made to the engine, in the case where the component serves to attach the line for conveying fuel to the engine. It should be noted that the component may include a second pipe for internally connecting the ventilation line or the fuel line coming from the pump. In this case, advantageously, said internal lines are connected to the component before it is fastened to the wall, while the external lines are attached afterwards to the moulded and preferably set (cooled) tank.

By establishing fluid communication between the inside and outside of the tank, the component is generally a network of an assembly of elements that communicate with each other.

The component may be made of any material with suitable mechanical strength and suitable resistance to chemicals (to fuels). It is preferably made of metal or plastic. Plastics are preferred for their lightness and ease of application. Any type of plastic may be suitable. Preferably, a plastic is chosen of which the dimensional stability is good in a medium subjected to temperature variations of the order of several tens of degrees Celsius. A plastic is also preferably chosen of which the dimensional stability is unaffected by contact with liquids and gases likely to be contained in the tank, and which is impermeable. Polyacetals, polyamides, polyesters and polyvinyl halides give good results. Plastics which are well suited, are polyacetals and in particular POM (or polyoxymethylene). In a particularly preferred manner, the component is made of injected plastic, that is to say having been formed by an injection moulding technique under pressure in a mould.

The component may be based on a material having low permeability to fuels or made of polyethylene. Preferably, when the component is based on polyethylene, it is treated so as to reduce its permeability. The treatment consists for example of sulphonation or fluorination of the component.

According to this variant of the invention, at least one part of the component of the parison is attached during production of the tank by moulding, that is to say before the mould is closed in step e).

1] Part of the component is secured to the parison by any suitable means. Generally, it involves the use of a support. A support is understood to denote a movable part capable of being secured temporarily to the component part so that it can be introduced into the parison and is able to be attached there (secured to the internal wall thereof). Conventional blow moulding methods often use a blow moulding blowpipe designed to introduce pressurized fluid which serves to blow into the mould, inside the parison. This blowpipe can serve as a support. Alternatively, a robot arm can be used as a support. This solution is quite suitable in the case of moulding by thermoforming. Finally, in moulding methods that make use of a core, the latter may act as a support.

By virtue of the movable nature of the support (core), the component is positioned inside the parison and, as soon as the correct position of the component is achieved, the component is fastened to the parison (to a portion of the internal surface thereof). Any fastening technique known to a person skilled in the art may be used within the context of the invention. It is possible for example to fasten, with the aid of the core, the component to the parison by pop-riveting or by welding the material in the contact zone of the component with the parison. It is also possible to overmould at least part of the component with the aid of the parison and/or to weld the component onto the said parison (in the case of compatible materials).

Once the component has been fastened to the parison, the support is withdrawn from the mould, where appropriate, and the mould is then closed onto the parison in order to produce the tank.

The method according to this variant of the invention additionally includes a step during which an opening is made in the wall of the tank and which can form part of the moulding method or be subsequent thereto. When the opening is made during moulding, it is preferably made by piercing the parison by means of a needle while the parison is put under pressure. In this case, movement of the needle is liable to create a spur of material on the periphery of the opening and this spur will advantageously be removed after the tank is moulded.

Consequently, in a preferred manner, the opening is made after the tank has been moulded, for example by cutting out a portion of the surface of the wall of the tank.

According to this variant of the invention, the component may comprise one or more assembled parts.

According to a first variant, the component consists of a single piece comprising a pipe and that this piece is fastened so that it passes through the opening in the wall of the tank. This variant has the disadvantage that an opening in the wall of the tank has to be made as the tank is moulded, before said component is fastened to the parison in order to allow the pipe to pass through the wall. Now, in this case, the parison is malleable and the shape of said opening is not then perfect and may require subsequent machining on the finished (cooled) tank.

According to a second variant, that is preferred (since it permits the production of the opening after the tank is moulded), the component comprises at least two parts, each provided with a pipe or orifice and following step f) the second part is fastened to the first or to the periphery of the opening in the wall of the tank outside this so that the pipes/orifices of these parts allow fluid to pass between the inside and outside of the tank. It is possible for example to attach the second part to the wall of the tank by welding onto the outer face thereof, on the periphery of said opening. Alternatively, the two parts could be provided with means of assembly capable of cooperating together in order to attach the second part onto the first.

In the method according to this variant of the invention, the component allows fluid communication between the inside and outside of the tank in a generally leakproof manner through the opening made in the wall of the tank.

Leakproofness is understood to be in relation to the liquid and/or gas contained in the tank under normal temperature and pressure conditions of use for the tank.

This leakproofness to liquids and gases is preferably ensured by the presence of a compressible seal inserted between one surface of the component and the wall of the tank. The seal used may have several shapes. It may for example consist of an o-ring. An o-ring with a circular cross section has given good results.

The compressible seal is generally made of an elastomeric plastic or of rubber. Preferably, the material of the seal is chosen to be a material that is inert to liquids and gases in contact with the concave surface of the tank.

The seal is preferably inserted in a groove so as to be compressed when the component is secured to the wall of the tank.

The component is advantageously positioned so that the o-ring is in contact with a barrier layer of the tank when the latter has a wall with a multilayer structure.

A special situation is envisaged when it is desired to attach to the parison a component such as a small pipe connected to an internal ventilation circuit, generally comprising a valve or several valves as well as a tank for separating liquid from vapour (so as to prevent drops of liquid fuel from being entrained to the canister, such a device being indispensable if the zero emission standards for vehicles ("ZEV" in the United States) are to be complied with). Starting from the steps of the method described above, the small pipe (and the ventilation circuit provided with its valves and its tank, where appropriate) is first of all attached to the core. Next, the core carrying the small pipe is introduced into the parison and the mould is closed. The parison is pressed onto the dies of the mould by blowing through the core and/or by suction under vacuum behind the dies.

During this step, there is equilibrium between the pressures inside the parison and inside the ventilation circuit, the pressure being equal to the blow moulding pressure. The small pipe is then attached to the parison with the aid of the core, and the mould is then degassed and opened in order to withdraw the core. At this stage, the pressure inside the parison is equal to atmospheric pressure while the pressure inside the ventilation circuit remains at the blow moulding pressure. In point of fact, since the parison is generally oriented along a substantially vertical axis, the valves are oriented along a substantially transverse axis with respect to that of the parison, that is to say at approximately 90.degree. with respect to the vertical.

In this situation the valves are generally closed, the blow moulding fluid being partly trapped inside the ventilation circuit. Since the ventilation circuit is not generally perfectly leakproof, the pressure inside said circuit tends towards atmospheric pressure since, in spite of their orientation, the valves have the tendency to open on account of their geometry and on account of the positive pressure difference between the inside of the ventilation circuit and the pressure inside the parison.

The mould is then closed in order to blow in a fluid under pressure. At this time, the pressure inside the ventilation circuit remains at the atmospheric pressure level without being brought again into equilibrium with the blow moulding pressure, since the valves are once again closed, this time because a negative pressure difference exists between the inside and outside of the ventilation circuit. As the method according to the invention proceeds, the ventilation system is generally subjected to a high pressure (equal to the blow moulding pressure, that is for example 10 bar) and this may lead to a deterioration in the valves. In order to remedy this disadvantage, equilibrium of pressure between the ventilation circuit and the internal pressure of the tank is advantageously provided by making an orifice in the small pipe attached to the wall of the tank. Said orifice will be closed after the blow moulding phases.

It should finally be noted that within the context of the invention, it may be advantageous to provide the core with "forms" (or forming tools) having an adjustable temperature and of which the aim is to assist in improving the distribution of thicknesses. As soon as the mould is closed for the first time on the core (in order to attach the accessories) jacks could move these forms and accompany the forming and stretching of the material (in order to improve the distribution of thicknesses).

Figure 2:
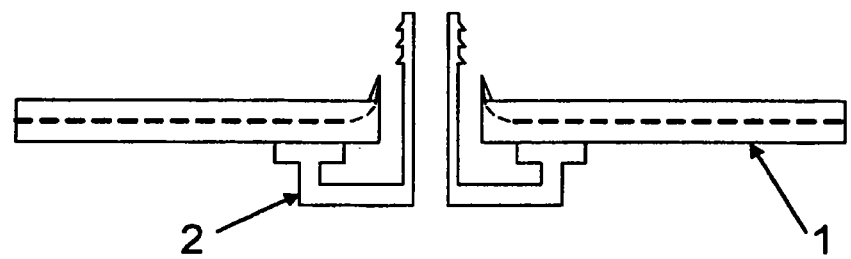
FIG. 2 represents a component in one piece (2) welded onto the inner face of the wall (1) of a tank and of which a part (with a tubular shape) passes through an opening made in the wall (1) of the fuel tank according to an embodiment of the invention.
Figure 3:
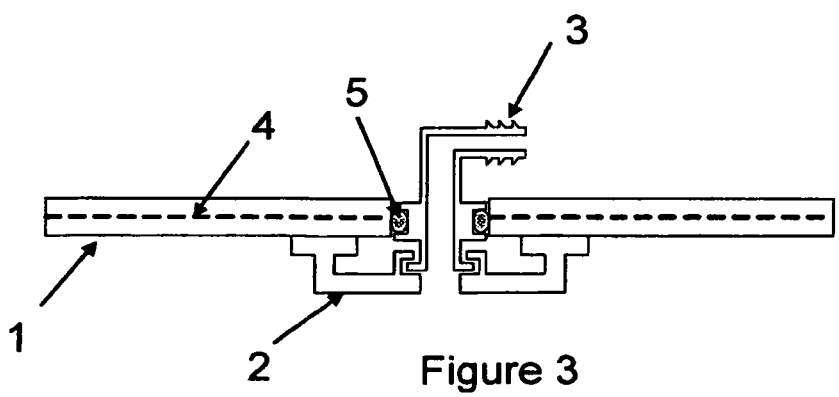
FIG. 3 corresponds to an embodiment where a component comprises a part (2) welded onto the inner face of the wall (1) of the tank and provided with means of assembly.

FIGS. 1 to 3 aim to illustrate some concrete aspects of the invention, without in any way restricting its scope.

FIG. 1 represents a component in two parts (2, 3), one of which (2) is welded onto the inner face of the wall (1) of a fuel tank and the other (3) is welded onto its outer surface. The two parts (2, 3) rest on the periphery of an opening made in the wall (1) of the tank.

FIG. 2 represents a component in one piece (2) welded onto the inner face of the wall (1) of a tank and of which a part (with a tubular shape) passes through an opening made in the wall (1) of the fuel tank. Since the component is in a single piece and comprises a pipe which must pass through the wall (1) of the tank, the orifice in this wall has to be made before said component is fastened to the parison when the latter is moulded. The presence of two spurs (1') will consequently be observed created by the movement of the needle that has been used to make the opening in the wall of the tank during moulding. These spurs (1') are removed during a finishing step.

FIG. 3 corresponds to an embodiment where a component comprises a part (2) welded onto the inner face of the wall (1) of the tank and provided with means of assembly. These means of assembly cooperate with the means of assembly of a second part of the component (3), partly inside the tank. The part (3) includes an o-ring (5) which is in contact with a bather layer (4) included within the multilayer structure of the wall (1).

The invention claimed is:

1. A method for producing a fuel tank provided with internal accessories and having a wall made of plastic made in a single piece by moulding a split parison or a parison in at least two parts, said method comprising:

a) the parison is introduced in the heat-softened state into a mould comprising dies;

b) a core on which the accessories are placed is introduced inside the parison and the accessories to be fastened are preheated;

c) the mould is closed and parison is pressed onto the dies of the mould such that the dies carry the parison and the core is in contact with the parison, which is consequently held in a sandwich between the core and the dies of the mould;

d) the preheated accessories are fastened to the parison with the aid of the core in a predetermined layout, and the mould is opened;

e) the core is withdrawn and the mould is closed;

f) the tank is moulded from the parison and the mould is opened; and g) the tank is removed from the mould.

2. The method according to claim 1, wherein at least one accessory is selected from the group consisting of a ventilation line, a line supplying fuel, a line supplying electricity, one or more anti-wave baffles, a reserve tank and a fuel gauge.

3. The method according to claim 1, wherein a camera or at least one sensor or a camera and at least one sensor for measuring values such as force, travel, pressure and temperature is incorporated in the core.

4. The method according to claim 1, wherein at least one accessory comprises a component provided with a pipe and/or an orifice for the passage of fluid and according to which during b), there is introduced inside the parison at least part of the component and, during d), this component part is fastened to the parison, this method additionally comprising making an opening in the wall of the tank, this opening being localized at the place where the component part is fastened to the parison so as to free the opening or pipe therefrom and to permit fluid communication between the inside and outside of the tank.

5. The method according to claim 4, wherein the component consists of a single piece comprising a pipe and that the pipe is fastened so that it passes through an opening in the wall of the tank.

6. The method according to claim 4, wherein the component comprises at least two parts, each provided with a pipe or orifice and that following f) one part is attached to the other part or to the periphery of the opening in the wall of the tank outside this so that the pipes/orifices of these parts allow fluid to pass between the inside and outside of the tank.

7. The method according to claim 6, wherein the one part is fastened to the wall of the tank by welding onto the outer face thereof, on the periphery of said opening.

8. The method according to claim 6, wherein the two component parts are assembled such that one part is positioned on the other part.

9. The method according to claim 1, wherein the tank comprises a multilayer structure comprising at least one thermoplastic layer and at least one barrier layer.

10. The method according to claim 9, wherein at least one accessory comprises a component provided with a pipe and/or an orifice for the passage of fluid, in that this component is provided with an o-ring and in that this component is positioned so that said o-ring is in contact with the barrier layer of the tank.

11. The method according to claim 10, wherein the component is based on polyethylene and has been subjected to a surface treatment or is based on a material having low permeability to fuels.

12. The method according to claim 1, wherein the accessories comprise an internal ventilation circuit provided with at least one valve and a small pipe, in that the tank is moulded by blow moulding and in that the small pipe has an orifice that is closed after the tank is blow moulded.

13. The method according to claim 1, wherein the accessories comprise a reserve tank, the position of which is selected so that the reserve tank can be connected directly with a pipe for filling the tank.

14. The method according to claim 13, wherein the connection between the reserve tank and the filling pipe is made with the aid of a flexible connection incorporating a non-return valve.

15. The method according to claim 13, wherein the reserve tank is fastened to the parison by pop-riveting.

16. The method according to claim 1, wherein the core is provided with at least one form having an adjustable temperature and being actuated by a jack so as to accompany the forming and stretching of the plastic.

17. The method according to claim 1, wherein the core is provided with heating parts keeping hot the part of the accessory to be fastened.

18. The method according to claim 17, wherein the core is provided with heating parts in the zone or zones that will be in contact with the parison during the placement of the accessories.

19. The method according to claim 1, wherein the accessories are preheated by infrared heating.

20. The method according to claim 1, wherein the accessories are preheated onto the core.

21. The method according to claim 1, wherein the accessories are preheated outside the core, on the frame of the machine without forming part of the core.

* * * * *